A. A. STRAIGHT.
POULTRY PERCH.
APPLICATION FILED APR. 5, 1910.

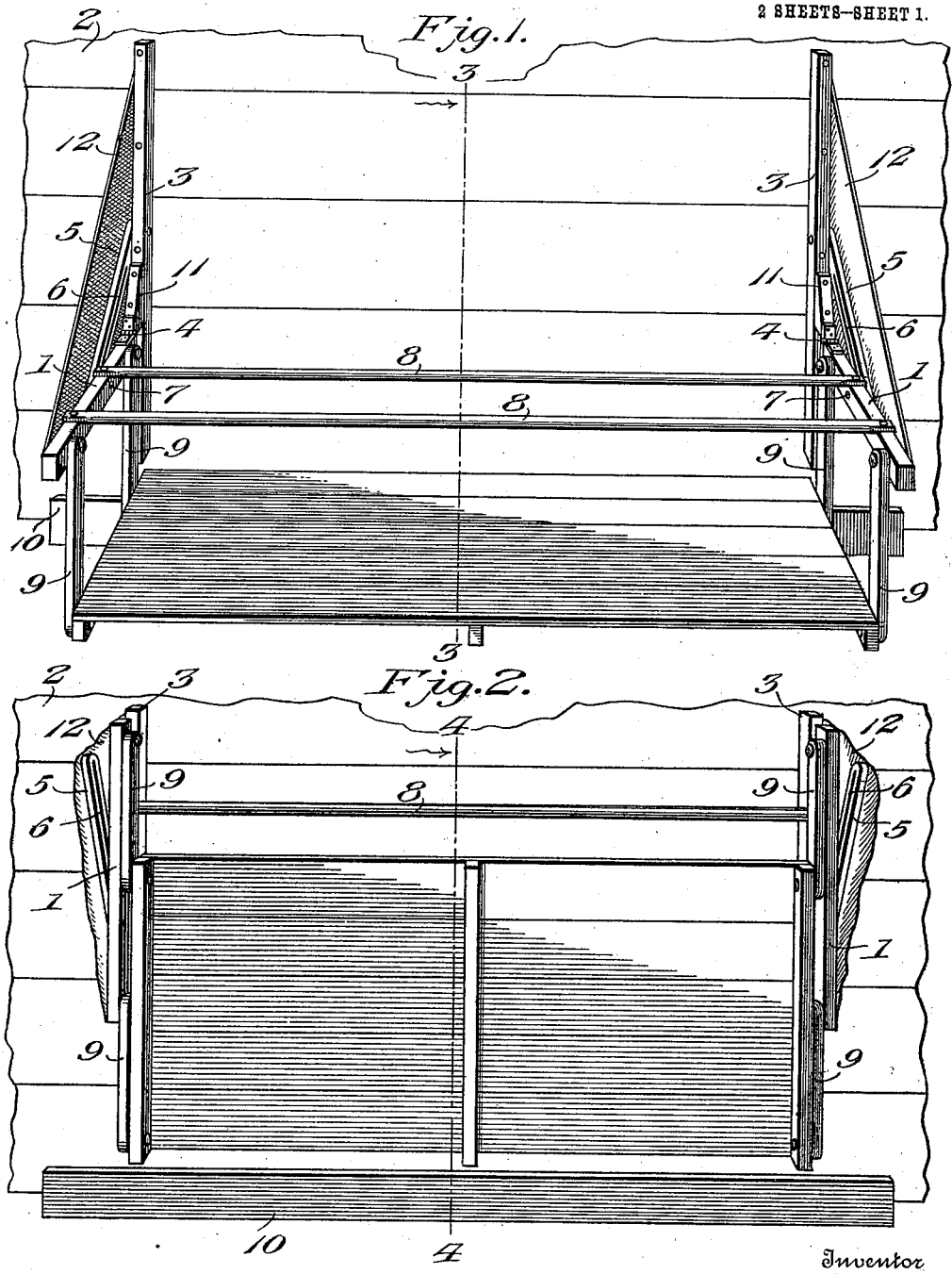

977,980.

Patented Dec. 6, 1910.
2 SHEETS—SHEET 2.

Witnesses
Edwin F. McKee
D. W. Gould.

Inventor
A. A. Straight
By Victor J. Evans
Attorney

UNITED STATES PATENT OFFICE.

ABRAHAM A. STRAIGHT, OF MANCHESTER, TENNESSEE.

POULTRY-PERCH.

977,980.   Specification of Letters Patent.   Patented Dec. 6, 1910.

Application filed April 5, 1910.   Serial No. 553,560.

*To all whom it may concern:*

Be it known that I, ABRAHAM A. STRAIGHT, a citizen of the United States, residing at Manchester, in the county of Coffee and State of Tennessee, have invented new and useful Improvements in Poultry-Perches, of which the following is a specification.

The invention relates to an improvement in poultry roosts, being more particularly directed to a roost and dropping board combined which, when not desired for use, may be quickly and conveniently moved into a folded position against the wall of the hen-house.

One of the main objects of the present invention is the provision of a folding poultry roost constructed to include a dropping board which, when the roost is projected into operative position, will be automatically disposed below the perch rods and, when the roost is folded, will be automatically elevated to deposit its accumulation into a trough forming a part of the roost, whereby the time and labor incident to the cleaning of the floor of the poultry house is entirely avoided and the droppings collected to permit their expeditious removal.

A further object of the invention is the provision of a poultry roost which, when projected into operative position, will afford ample space for roosting purposes and which, when folded, will afford the entire floor space for use in feeding and the like, the movement of the roost from one position to the other being readily and quickly accomplished by a single movement on the part of the operator.

The invention in its preferred details of construction will be described in the following specification, reference being had particularly to the accompanying drawings, in which:—

Figure 3:
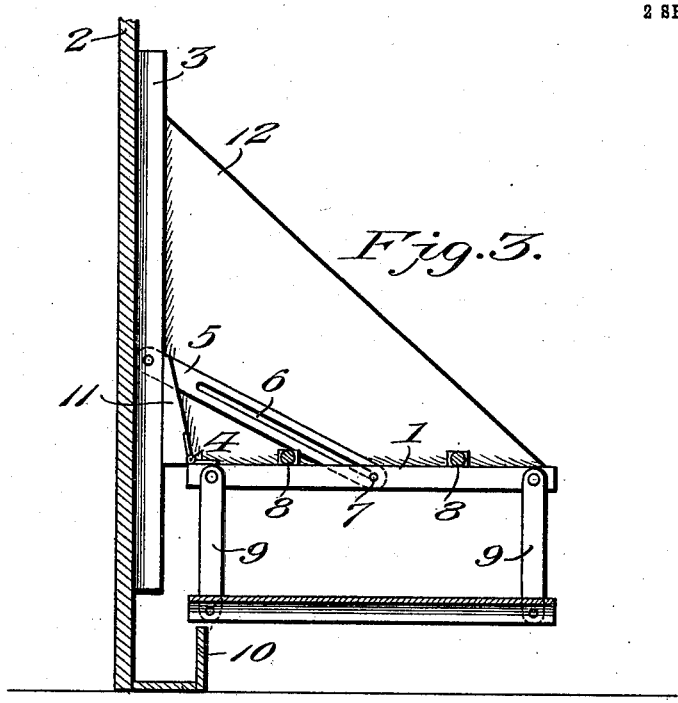
Figure 4:
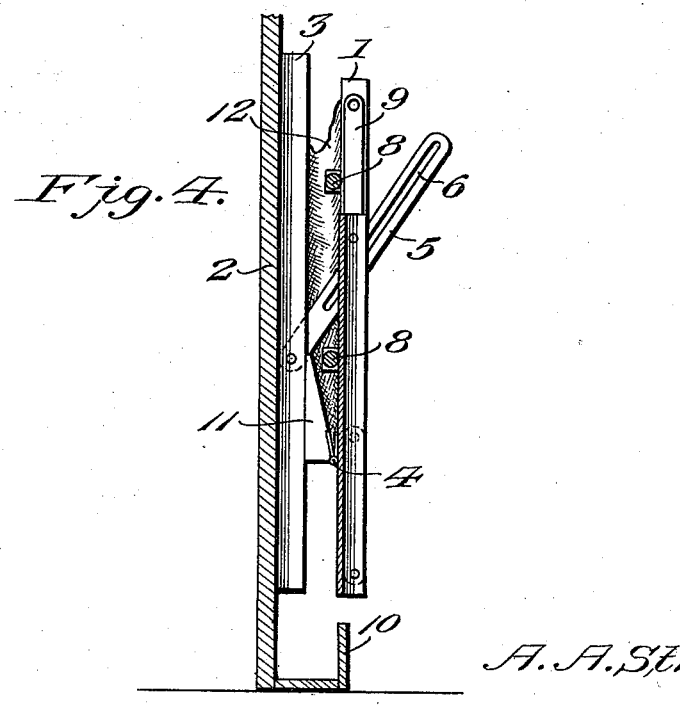

Figure 1 is a perspective view showing the roost in open or operative position. Fig. 2 is a similar view showing the roost in inoperative or folded position. Fig. 3 is a section on line 3—3 of Fig. 1. Fig. 4 is a section on line 4—4 of Fig. 2.

Referring particularly to the accompanying drawings, wherein is illustrated the preferred embodiment of details, the improved poultry roost comprises arms 1 hingedly connected to the wall 2 of the poultry house. The arms may be connected directly to the wall though I prefer, for convenience in manufacturing the roost and in the application thereof to the poultry house, to provide as a part of the roost structure uprights 3 which may be secured directly to the wall and to which uprights the arms 1 are hingedly connected, as at 4. Limiting bars 5 are pivotally connected respectively at their inner ends to the uprights 3, and are each formed with longitudinally disposed slots 6 to receive headed studs or screws 7 engaging the arms 1. The bars 5 serve to guide the arms in operation and limit their movement toward operative position so as to effectively support the arms in approximately horizontal position, as will be plain from Fig. 1.

The arms 1 are connected by perch rods 8, the respective ends of the rods being connected in any appropriate manner to the respective arms. In this connection it is to be understood that the arms 1 may be spaced apart any desired distance and may be of any length to accommodate any number of perch rods.

Pivotally connected to the respective arms adjacent the ends thereof are hanger rods 9, which rods are pivotally connected at their lower ends to what will be termed a dropping board, constituting in effect a solid, light platform of a size to correspond to the surface area included between the arms 1. By this arrangement, when the arms are projected into operative position, the dropping board will underlie the perch rods, and when the arms are folded into inoperative position against the wall of the poultry house, as shown in Fig. 2, the board will fold upward with the arms and, by reason of the pivotal connection of the hanger rods, will lie snugly against said arms.

Secured to the wall 2 is a trough 10, preferably of rectangular shape in cross section, and preferably, though not necessarily utilizing the wall 2 as a rear wall of the trough. The trough is open at the ends and is so positioned that when the roost is folded the lower edge of the dropping board occupies a position immediately above and between the front and rear walls of the trough. By this means the accumulation on the dropping board will, in the act of folding the roost, be discharged into the trough from which it can be conveniently removed in a simple and expeditious manner.

The upper ends of the arms may be secured to the wall by any convenient means to hold the roost in folded position, or if desired, as illustrated, the arms 1 may be hingedly connected to blocks 11, which in turn are secured to the wall or to the uprights, the outer surfaces of which blocks incline upwardly and inwardly, so that when the parts are folded the arms are given a sufficient inward inclination to support them in folded position.

If desired, the uprights 3 and the arms 1 may be connected by a flexible curtain 12 serving to prevent the poultry from roosting on the arms or guide bars, though such curtains are not deemed absolutely necessary in the practical device.

The improved construction presents many advantages in the class to which it relates, being a great time and labor saver in that it catches all of the droppings of the night's roost and automatically discharges them into the trough when the roost is folded. This eliminates the toilsome and time consuming labor of cleaning the floor of the hen-house each morning, and also permits a single operator to go through the poultry house and by a single movement throw each of the poultry roosts to inoperative or folded position, disposing of all of the droppings, providing the full floor space of the house for scratching and feeding and thereby enables one man to take care of a larger number of fowls with much more effective results than is possible under other circumstances.

It is of course to be understood that any desired material may be used for the various parts of the poultry roost and that its parts may be constructed in any desired size and, within the scope of the appended claims, with any desired modifications or changes in structure from the illustrated and described arrangement.

Having thus described the invention, what I claim as new, is:—

1. A poultry roost including a support, a perch rod, connecting means between said support and said perch rod whereby said rod may be moved into operative or inoperative position with respect to the support, and a dropping board carried by and movable with the perch rod.

2. A poultry roost including a support, a perch rod, connecting means between said support and said perch rod whereby said rod may be moved into operative or inoperative position with respect to the support, and a dropping board carried by and movable with the perch rod, the connection between the board and rods causing said board to move to a position to underlie the perch rod when the latter is moved to an operative position.

3. A poultry roost including a support, a perch rod, connecting means between said support and said perch rod whereby said rod may be moved into operative or inoperative position with respect to the support, and a dropping board carried by and movable with the perch rods, said board automatically moving to a position to underlie the perch rod when the latter is moved to an operative position, and automatically moving to an inclined discharging position when the perch rod is moved to an inoperative position.

4. A poultry roost including a support, a perch rod, connecting means between said support and said perch rod whereby said rod may be moved into operative or inoperative position with respect to the support, links movably connected at one end to the rod, a dropping board carried by and movably connected to the opposing ends of the links, whereby said board automatically moves to a position to underlie the perch rod when the latter is moved to an operative position and automatically moves to an inclined discharging position when the perch rod is moved to an inoperative position, and a trough to receive the material discharged from the dropping board when the latter is moved to an inoperative position.

5. A poultry roost including a perch rod, a dropping board carried thereby, means for moving the perch rod to an inoperative position, connections between the rod and board to move the latter to a discharging position in the movement of the rod to an inoperative position, and a trough to receive the material from the board when in discharging position.

6. The combination with a poultry house, of arms hinged to the walls thereof, a perch rod connecting the arms, a dropping board, links movably supporting said board at spaced points from the arms, said links permitting the board to underlie the perch rod when the parts are in operative position and causing said board to be arranged in discharging position when the arms are moved to inoperative position, and a trough to receive the material from the board when the latter is in discharging position.

In testimony whereof I affix my signature in presence of two witnesses.

ABRAHAM A. STRAIGHT.

Witnesses:
W. H. ASHER,
E. S. HOUGH.